(12) United States Patent
Grannaes

(10) Patent No.: US 10,754,579 B2
(45) Date of Patent: Aug. 25, 2020

(54) RELIABLE NON-VOLATILE MEMORY PROGRAMMING INTERFACE AND METHOD THEREFOR

(71) Applicant: Silicon Laboratories Inc., Austin, TX (US)

(72) Inventor: Marius Grannaes, Oslo (NO)

(73) Assignee: SILICON LABORATORIES INC., Austin, TX (US)

(*) Notice: Subject to any disclaimer, the term of this patent is extended or adjusted under 35 U.S.C. 154(b) by 100 days.

(21) Appl. No.: 15/714,487

(22) Filed: Sep. 25, 2017

(65) Prior Publication Data

US 2019/0095133 A1    Mar. 28, 2019

(51) Int. Cl.
*G06F 12/10* (2016.01)
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0616* (2013.01); *G06F 3/0679* (2013.01); *G06F 12/02* (2013.01)

(58) Field of Classification Search
CPC ................................ G06F 3/0659; G06F 12/02
USPC ........................................................ 711/103
See application file for complete search history.

(56) References Cited

U.S. PATENT DOCUMENTS

2009/0037646 A1* 2/2009 Molotchko ......... G06F 12/0246
711/103

OTHER PUBLICATIONS

EFM32, EEPROM Emulation, AN0019, Application Note, Silicon Laboratories Inc, Sep. 2013, 15 pages, Rev1.09, Silicon Laboratories Inc, 400 West Cesar Chavez, Austin, TX 78701, United States.
Hare, "No Bugs," "Journaled Flash Storage—Emulating EEPROM over Flash, ACID Transactions and More, Part I—Flash vs EEPROM," https://www.ITHare.com, Sep. 28, 2015, 15 pages.

* cited by examiner

*Primary Examiner* — Jae U Yu
(74) *Attorney, Agent, or Firm* — Polansky & Associates, P.L.L.C.; Paul J. Polansky

(57) ABSTRACT

In one form, a non-volatile memory driver includes a function library defining a plurality of native function calls, and a hardware abstraction layer having an input coupled to and output of the function library for receiving the at least one instruction, and an output for providing a plurality of signals to cause a non-volatile memory to execute the at least one instruction. The non-volatile memory driver maintains the flash memory as a circular buffer using a bottom sector pointer and a next location pointer. In response to receiving a housekeeping command generated from corresponding command from an application layer as the selected native function call, the function library causes the hardware abstraction layer to selectively repack valid data of a bottom sector indicated by said bottom sector pointer using the next location pointer, and to selectively erase the bottom sector.

22 Claims, 8 Drawing Sheets

RELIABLE NON-VOLATILE MEMORY PROGRAMMING INTERFACE AND METHOD THEREFOR

FIELD OF THE DISCLOSURE

The present disclosure relates generally to computer systems, and more particularly to computer systems using non-volatile memory such as FLASH memory.

BACKGROUND

Certain digital devices such as microcontrollers (MCUs) have become very useful in hand held digital electronics such as mobile phones, personal digital assistants, wearable electronics, deeply embedded smart devices such as smart light bulbs, and the like. These devices typically require persistent memory to store programs and data that retain their contents even when power is interrupted. In particular, battery-based devices can have their power interrupted unexpectedly during operation and these devices need to be able to recover from an unexpected loss of power without loss of data. A common form of non-volatile memory known as "flash" memory is based on floating gate technology and suffers from wear-out after a certain number of erase and write cycles. It is important to uniformly spread the number of write and erase cycles over all sectors so that no memory cells wear out long before the other memory cells. In addition, writing or erasing of data requires a relatively long amount of time to complete, and write or erase latency can cause disruption in program operation leading to poor performance.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well. In the following description, numbers in hexadecimal format are indicated with "0×" prefix before the number.

DETAILED DESCRIPTION

Figure 1:
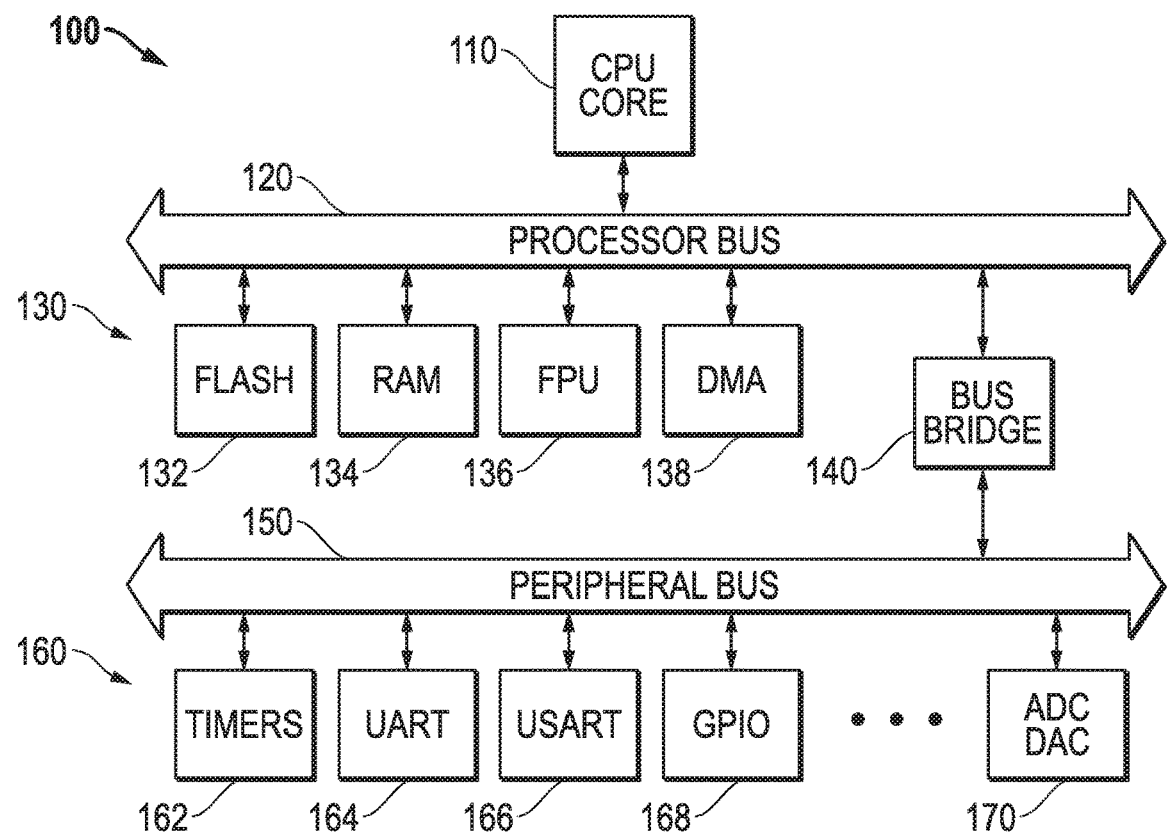
FIG. 1 illustrates in block diagram form a microcontroller with embedded flash according to an embodiment.

FIG. 1 illustrates in block diagram form a microcontroller 100 with embedded flash according to an embodiment. Microcontroller 100 includes generally a central processing unit (CPU) core 110, a processor bus 120, a set of processor bus devices 130, a bus bridge 140, a peripheral bus 150, and a set of peripheral bus devices 160. CPU core 110 is a data processor that is connected to processor bus 120 and accesses memory and peripheral devices over processor bus 120 according to the stored program. Processor bus devices 130 include a non-volatile memory (NVM) in the form of a flash memory 132, a random access memory (RAM) 134, a floating-point unit (FPU) 136, and a direct memory access controller (DMAC) 138, all bidirectionally connected to CPU core 110 over processor bus 120. Bus bridge 140 is bidirectionally connected to both processor bus 120 and peripheral bus 150 and allows read and write transactions to take place between the devices located on processor bus 120 and peripheral bus 150. Peripheral bus devices 160 include a set of timers 162, a universal asynchronous receiver-transmitter (UART) 164, a universal synchronous/asynchronous receiver-transmitter (USART) 166, a set of general purpose input/output ports (GPIO) 168, and a combined analog-to-digital converter (ADC) and digital-to-analog converter (DAC) 170. There are a wide variety of known microcontroller configurations and the non-volatile memory system described herein is not limited to any particular configuration. Microcontroller 100 however is typical of the type of microcontroller that can be used in a battery-powered application that is subject to power outages and to which the non-volatile memory system disclosed herein is applicable. Various aspects of this non-volatile memory system will now be described.

Figure 2:
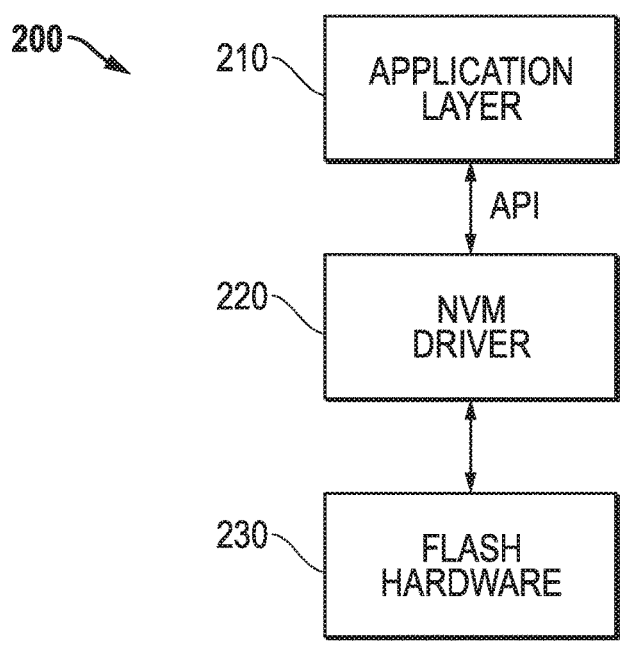
FIG. 2 illustrates an NVM system used in the microcontroller of FIG. 1.

FIG. 2 illustrates an NVM system 200 used in microcontroller 100 of FIG. 1. NVM system 200 is an abstraction of a NVM system including both software and hardware components that allow application programs to use it with a simple command interface and without a detailed knowledge of the hardware configuration. NVM system 200 is useful in describing the interaction of hardware and software components in microcontroller 100 and includes an application layer 210, an NVM driver 220, and flash hardware 230. NVM system 200 may include any type of persistent memory that is subject to wear-out and/or uneven read and write or erase times, and as used herein, "non-volatile memory" includes erasable programmable read-only memory (EEPROM), flash memory, magneto-resistive memory (MRAM), phase-change memory (PCM), and the like. For simplification of the discussion, NVM system 200 will be described in terms of flash memory but it should be understood that the following description implies other embodiments using other types of NVM.

Application layer 210 represents one or more stored programs that run on CPU core 110 that may access a user data portion of flash memory 132. The instructions for programs in application layer 210 are typically stored in an application code portion of flash memory 132. The number and type of application programs will vary based on the specific type of application. For example in a mobile device such as a smart phone, application layer 210 includes the mobile operating system as well of various firmware and user selectable programs or "apps" that will pre-installed on the mobile phone or chosen by and downloaded by the user. Application layer 210 initiates operations with the NVM system using an application programming interface (API) that will be described more fully below.

NVM driver 220 is a firmware driver that allows the application programs to interact with the flash hardware 230. NVM driver 220 translates a set of calls defined by the API into one or more hardware-specific commands that vary based on the configuration of the flash memory.

Flash hardware 230 corresponds to flash memory 132. Flash hardware 230 includes not only arrays of memory cells organized into sectors, but other circuitry commonly implemented with and closely coupled to the flash memory cells, including block erase capability, automatic verification of writes and erasures, and the like.

According to the various embodiments disclosed herein, NVM driver 220 supports several mechanisms to allow the efficient wear-leveling of the flash hardware 230, while providing crash recovery and enhanced features to improve the efficiency of managing the flash hardware overhead.

One such mechanism is a new application-layer visible housekeeping function to allow the application layer itself to directly control the timing of memory repacking operations needed for implementation of the wear-leveling circular buffer. Since repacking operations require data movement and/or sector erase operations, the housekeeping function allows the application layer itself to perform the operation at a convenient time that the application program can choose in consideration of its own real-time performance requirements.

Another mechanism is a resizing function that allows the relative size of firmware and data memory to be dynamically changed. In some environments such as mobile devices, the mobile operating system is periodically updated and the set of installed apps is changed by the user. A new resizing function preserves the uniform wear leveling while re-allocating the size of the user-accessible portion based on the size needed for installed application code.

Yet another mechanism is the provision of new counter-type objects that can be effectively wear-leveled with ordinary data stored in the NVM. Implementing counters in NVM while maintaining uniform wear-leveling is difficult. A typical binary counter requires the bits of the counter to be incremented and therefore to change as often as the counter counts up. However in flash memory, writing a "0" is relatively fast while writing a "1" to the flash is time consuming and requires a whole sector to be erased and re-programmed. The new counter-type objects allow the application program to increment or decrement them without erasure while providing uniform wear-leveling of the sector. These features will be described in detail below.

Figure 3:
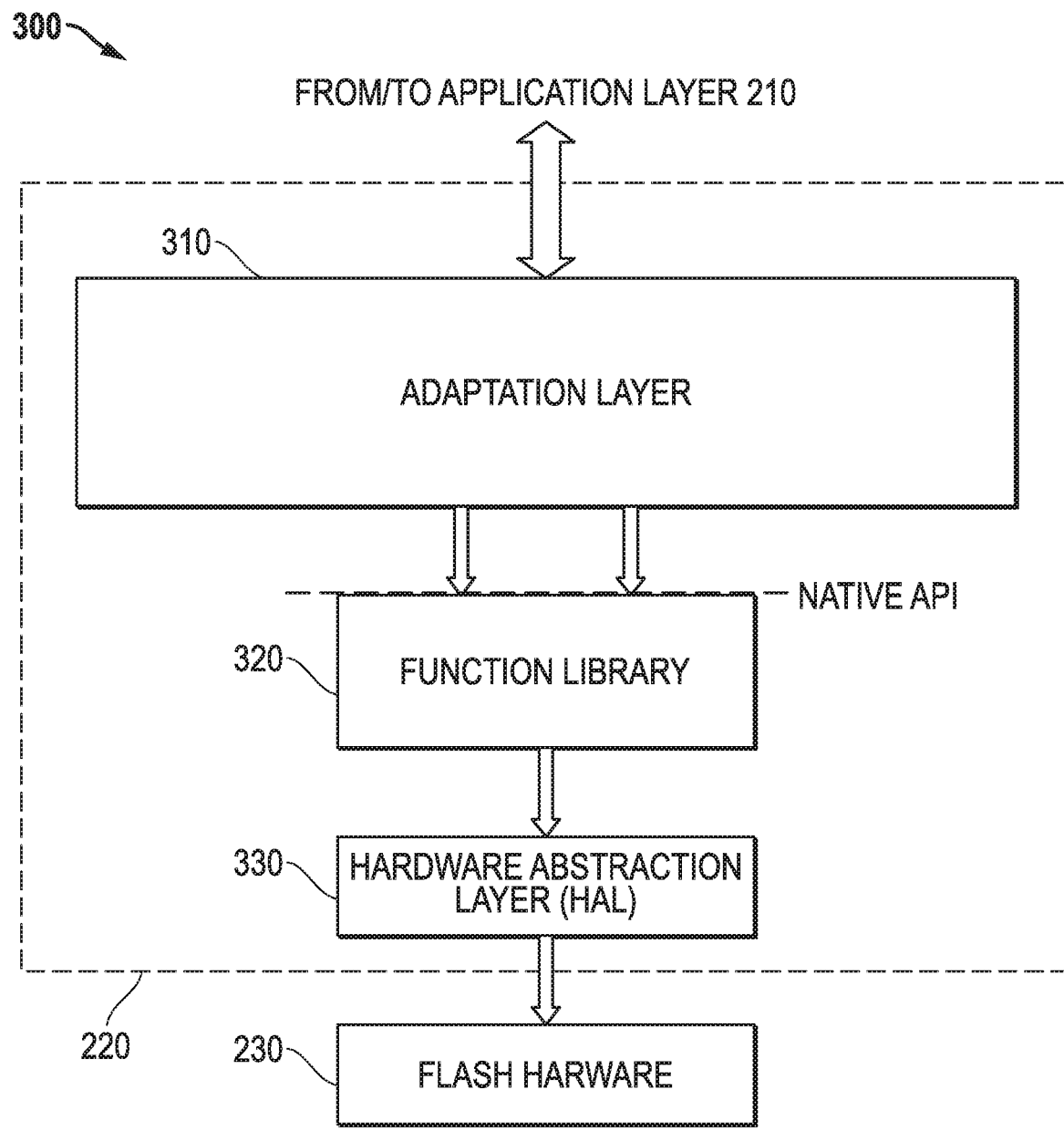
FIG. 3 illustrates in block diagram form a portion of the NVM system of FIG. 2 showing details of the NVM driver.

FIG. 3 illustrates in block diagram form a portion 300 of NVM system 200 of FIG. 2 showing details of NVM driver 220. Portion 300 shows NVM driver 220 connected to flash hardware 230. NVM driver 220 includes an adaptation layer 310, a function library 320, and a hardware abstraction layer 330. Adaptation layer 310 allows NVM driver 220 to be ported to different runtime environments and provides a translation between the API visible to application layer 210 and the native API of NVM driver 220. Function library 320 supports a set of native function calls, and presents them as one or more instructions to hardware abstraction layer 330. Hardware abstraction layer 330 provides an application specific translation between native commands and flash hardware 230. For example, a typical microcontroller family has different models that contain different amounts of flash memory. Hardware abstraction layer 330 allows a common function library to operate with all these variants without modification.

In the exemplary embodiment, function library 320 supports the following functions or commands through its native API:

TABLE I

| Command | Function call name | Function call description |
|---|---|---|
| Initialize | NVM3_init | Initialize an NVM instance |
| Resize | NVM3_reSize | Resize the NVM |
| Write pair | NVM3_writeData | Write (key, value) pair to NVM |
| Read pair | NVM3_readData | Read (key, value) pair from NVM |
| Write counter | NVM3_writeCounter | Write counter value |
| Read counter | NVM3_readCounter | Read counter value |
| Increment counter | NVM3_incrementCounter | Increment counter value |
| Return size of key value | NVM3_getObjectSize | Return size of key in number of bytes |
| Erase the NVM | NVM3_eraseObject | Erase specified object (key, value) in the NVM |
| Erase all objects in NVM | NVM3_eraseAllData | Erase all objects in the NVM |
| Return MAX erase count value | NVM3_getEraseCount | Get maximum erase count value |
| Housekeeping | NVM3_houseKeeping | Repack data and erase a sector |
| Housekeeping needed check | NVM3_houseKeepingNeeded | Check whether housekeeping is required |
| Full memory repacking | NVM3_fullMemoryRepacking | Perform complete memory repacking to get most compact size |

Various functions that are useful in implementing the NVM system in mobile environments will now be described.

Sector Formatting

Figure 4:
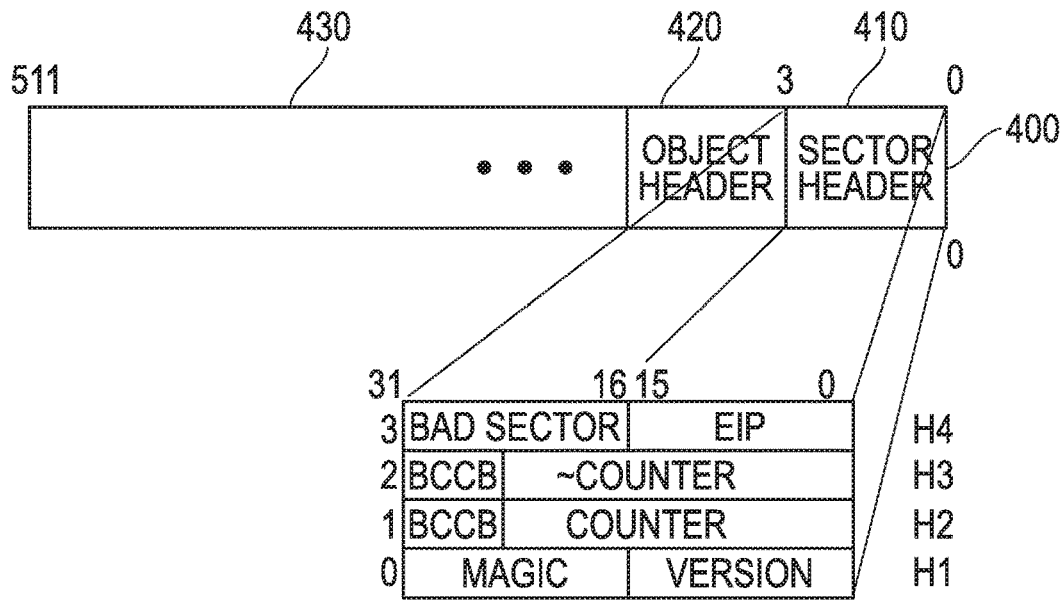
FIG. 4 illustrates a diagram of a sector of the flash hardware of FIG. 3 showing the format of a sector header.

FIG. 4 illustrates a diagram of a sector 400 of flash hardware 230 of FIG. 2 showing the format of a sector header. Sector 400 includes generally a sector header 410 at the beginning (lowest addresses in the sector) of sector 400, followed by an object header 420, which is followed by a remaining portion 430 of sector 400. In the disclosed embodiment, headers such as object header 420 are of indeterminate length, so the number of object headers in remaining portion 430 will vary.

Sector header 410 has four 32-bit words labeled "H1", "H2", "H3", and "H4" in offsets 0, 1, 2, and 3, respectively, of sector header 410. The H1 word includes a 16-bit VERSION number and a 16-bit field labeled "MAGIC". The VERSION number indicates the version of NVM driver 220. The MAGIC field can have any one of a variety of values as long as the selected value has a balanced mixture of "0"s and "1"s, for example 0xB29A. The MAGIC field allows NVM driver 220 to determine at boot-up whether an erase was in progress when power was lost.

The H2 field includes a 27-bit field labeled "COUNTER" and a 5-bit field labeled "BCCB". The COUNTER field is erased and incremented at every sector erasure. Since it is wear-leveled with the rest of sector 400, it can be incremented as a normal binary counter. NVM driver 220 uses the COUNTER field in wear leveling but also to detect the bottom sector of the circular buffer (which will be described further below). The BCCB field contains a 5-bit Berger code that functions as check bits value for the COUNTER field. The BCCB field allows NVM driver 220 to determine whether the value of the COUNTER is correct.

The H3 field includes a 27-bit field labeled "COUNTER~" and a 5-bit BCCB field which contains check bits for the COUNTER~ field. The COUNTER~ field contains an inverted value of the COUNTER field in the H2, and NVM driver 220 can use it if a problem is detected in the COUNTER field in H2, e.g. its corresponding BCCB field is wrong.

The H4 field contains a 16-bit field labeled "EIP" and a 16-bit field labeled "BAD SECTOR". The EIP field indicates an erase in progress. NVM driver 220 clears the EIP field to 0xFFFF during sector erasure, and re-writes it to 0xA5A5 before the start of a sector erase operation. Thus any value other than 0xFFFF indicates that an erase operation is still in progress or was in progress when power was lost. The BAD SECTOR field indicates the validity of sector 400. During an erase operation, the BAD SECTOR field is cleared to 0xFFFF. When a write or erase operation fails, NVM driver 220 marks the sector invalid by writing a "0" to one or more bits to the BAD SECTOR field. Thereafter, NVM driver 220 can exclude the bad sector from the circular buffer.

When writing sector header 410 after an erase operation, NVM driver 220 writes H3 first, followed by H2, and then finally H1. NVM driver 220 does not write H4, but leaves it in its erased state.

Object header 420 can have any one of a set of formats depending on whether the form is a data object or a counter object, and whether the object is a large object or a small object. These basic forms will now be described.

Figure 5:
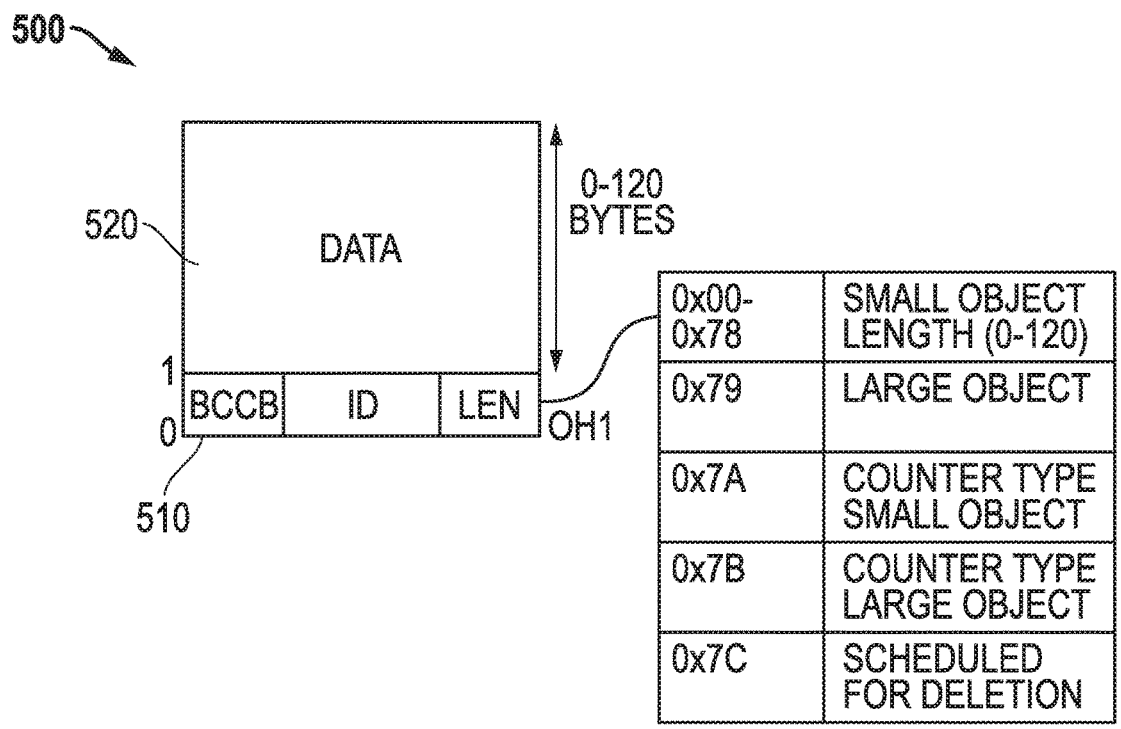
FIG. 5 illustrates a diagram showing the format of a small object.

FIG. 5 illustrates a diagram showing the format of a small object 500. Small object 500 includes a small object header 510 labeled "OH1" and a data field 520. Small object header 510 include a single 32-bit header word having an 7-bit "LEN" field in the lowest 8-bits, followed by a 20-bit field labeled "ID" and a 5-but BCCB field. The LEN field indicates the state of the object, the type of object, and/or the length of the object depending on its value. If the counter is a small-object counter, then the LEN indicates the length, from 0 to 120 bytes, between 0x00 and 0x78. A LEN field of 0x79 indicates that the object is a large object. If the object is a large object, then the object header format changes and includes further header words that contain more information. A LEN field of 0x7A indicates that the object is a counter type small object, whereas a LEN field of 0x7B indicates that the object is a counter type large object, both of which will be described further below. A LEN field of 0x7C indicates that NVM driver 220 has scheduled the object for deletion. Other possible values of 0x7D-0x7F are reserved for future use.

The ID field stores the identification key of the object. NVM driver 220 uses the ID field to associate the flash object with an address in the physical memory space of microcontroller 100. During a read or write operation to a particular address, NVM driver 220 associatively checks the key field of each object in the circular buffer for a match. In some embodiments, NVM driver 220 can maintain a table of memory keys and corresponding locations in the circular buffer to avoid having to search through flash memory 132. The BCCB field is a check code for the header only.

During a write operation, NVM driver 220 writes the data first and the header last. Writing the information in this order protects the NVM system from indicating a valid object if power is lost before the write operation is complete. NVM system 200 allows for a zero-sized object with a null data field by writing the LEN field of the header to 0x00.

Figure 6:
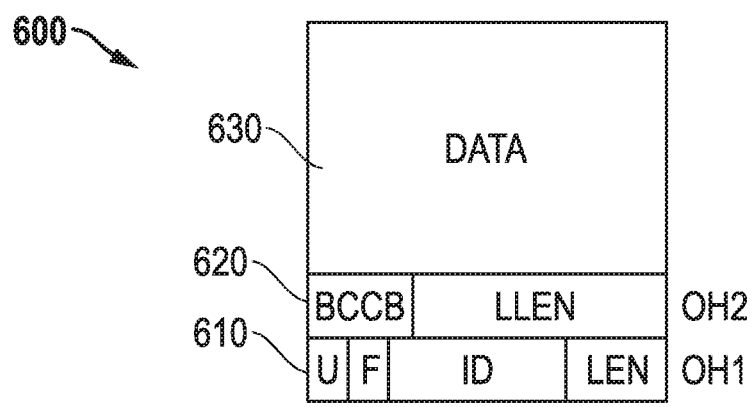
FIG. 6 illustrates a diagram showing the format of a large object.

FIG. 6 illustrates a diagram showing the format of a large object 600. Large object 600 includes a large object header including a first word 610 labeled "OH1" and a second word 620 labeled "OH2", and a data field 630. First word 610 includes a 7-bit LEN field in the lowest 7-bits followed by a 20-bit ID field, each having the same bits as for the small object header as discussed above. However instead of the BCCB field, first word 610 includes a 2-bit field labeled "F" field and a 3-bit field labeled "U". The F field defines whether the object is fragmented. A value of 0 indicates an un-fragmented object. A value of 1 indicates that large object 600 is the first fragment of a fragmented object. A value of 2 indicates that large object 600 is an intermediate fragment of a fragmented object. A value of 3 indicates that large object 600 is the last fragment of a fragmented object. The U field indicates unused bits, which are cleared.

Second word 620 includes a 26-bit field large object length field labeled "LLEN" in the lowest bits, and a 6-bit BCCB field in the upper bits. The LLEN field indicates the length of the large object (or of the fragment if the object is a fragment of a large object). The BCCB bits apply to the header of the large object (or to the header of the fragment if the object is a fragment of a large object).

During a write operation, NVM driver 220 writes data field 630 first, followed by second word 620 and then first word 610. If the write requires fragmented objects, NVM driver 220 stores the fragmented objects from first to last. NVM driver 220 stores the data word-aligned (i.e. aligned on 4-byte boundaries). Whenever an object size is not word aligned, NVM driver 220 pads the remaining bytes of the data field with "1"s.

The format of small object 500 applies to both data type small objects and counter-type small objects. Likewise the format of large object 600 applies to both data type large objects and counter-type large objects. Only the content of the data portion of the object changes when the object is a counter-type object, in a manner that will be described further below.

Housekeeping Commands

According to a new set of commands known as housekeeping commands, redundant and stale copies of data elements can be repacked and memory sectors can be erased and reclaimed for use in new operations. Because the housekeeping commands are made available to the application layer, each application program can schedule them at convenient times that it is aware of but that the hardware is not, such as when a mobile phone call is not in progress, to better hide their overhead. The operation of the housekeeping command will be described in terms of a simplified example in which the flash memory has only four sectors each supporting ten objects including a sector header and a set of nine data and/or counter objects, assumed to be the same size.

In order to avoid the latency to the application layer, NVM driver 220 only initiates a repacking operation itself when it is strictly needed, such as when an object cannot be stored without repacking. Thus it is primarily the responsibility of the application layer to call the housekeeping function. In the illustrated embodiment, the housekeeping function will either erase a sector or move current copies of data to a new sector (or to unwritten portions of an existing sector), based on the state of the bottom sector. In other embodiments, the data movement and sector erasure can be done in response to a single housekeeping function call.

Figure 7:
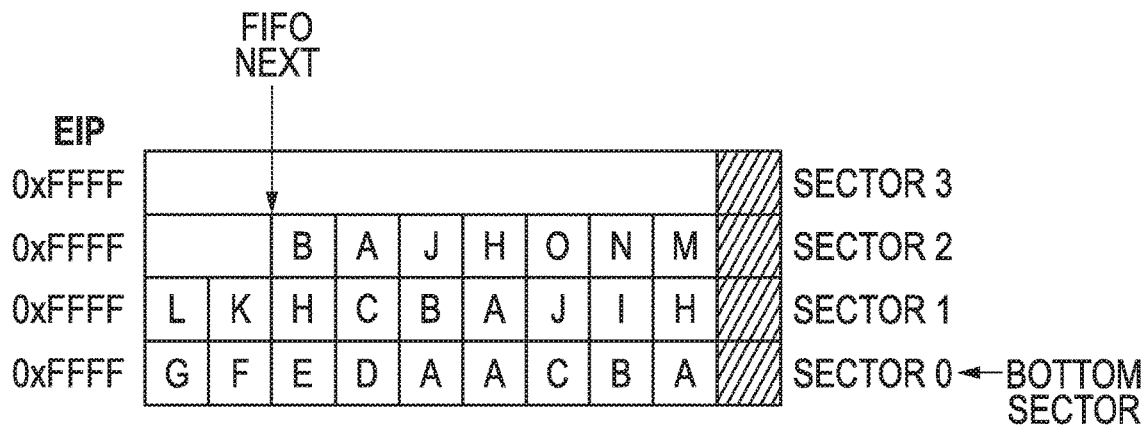
FIG. 7 illustrates a simplified diagram showing a state of the embedded flash before a start of a housekeeping operation.

FIG. 7 illustrates a simplified diagram showing a state 700 of flash memory 132 before a start of a housekeeping operation. In state 700, sectors 0, 1, and 2 have been written with data elements A-M, some of which have stale copies that were superseded by later copies, with a portion of Sector 2 and all of Sector 3 being in the erased state. NVM driver 220 maintains the data as a circular buffer in which the bottom of the circular buffer (in this case Sector 0) indicated by a BOTTOM SECTOR pointer, and the top of the circular buffer indicated by a FIFO NEXT pointer (in this case the ninth location of Sector 2). In this example, Sector 0 has a sector header in the lowest position and data elements A, B, C, A, A, D, E, F, and G in the next nine successive positions. Sector 1 has a sector header in the lowest position and data elements H, I, J, A, B, C, H, K, and L in the next nine successive positions. Sector 2 has a sector header in the lowest position and data elements M, N, O, H, J, A, and B in the next seven successive positions, while the last two positions remain erased. Sector 3 has a sector header in the lowest position, while the last nine positions remain erased.

NVM driver 220 operates flash memory 130 as a circular buffer to facilitate uniform wear leveling. Thus the instance of a particular data element with the highest address relative to the bottom of the circular buffer represents the most recent version, while stale versions may exist in lower addresses. For example for data element A, the current version is in the seventh position in Sector 2, while the first, fourth, and fifth positions of Sector 0 and the fifth position of Sector 1 contain stale versions. Before the housekeeping function call, no sector is being erased so the EIP field of each sector has the value of 0xFFFF. The header of Sector 0 indicates that it is the bottom sector because the COUNTER value is difference from the COUNTER of Sector 3 (which was cleared after an erase operation), while the FIFO NEXT pointer indicates the ninth position of Sector 2.

Figure 8:
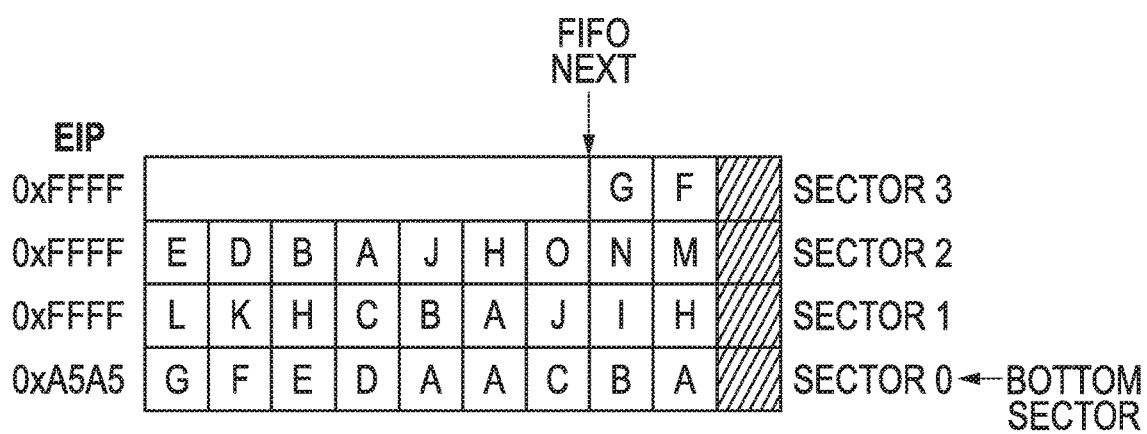
FIG. 8 illustrates a simplified diagram showing a state of the embedded flash after a first housekeeping function call.

FIG. 8 illustrates a simplified diagram showing a state 800 of the embedded flash after a first housekeeping function call. In response to receiving the housekeeping function call, NVM driver 220 identifies the data elements in the bottom sector that are the current (i.e. the latest or most up-to-date) copies, and moves them to the top of the circular buffer. Thus, elements D, E, F, and G are the data elements in Sector 0 that are the current copies, and they are moved to the next locations in Sector 2 and then Sector 3 using the FIFO NEXT pointer, which is updated after every move. After elements D, E, F, and G have been moved to Sector 2 or Sector 3, NVM driver 220 writes a value of 0xA5A5 to the EIP field of the sector header in Sector 0, indicating that an erase is in progress and tagging Sector 0 for erase. In this way, at the next housekeeping function call, NVM driver 220 will determine that the operation to be performed is an erase of Sector 0.

The steps occur in this order to prevent a power outage that can occur at any time during this sequence from corrupting data. If a power outage occurs during the writing of the current copy of the data to the top of memory, then upon restoration of power, NVM driver 220 will see the EIP indicator showing no erase in progress, and upon receiving the next housekeeping command, will be able to perform these operations as normal while preserving the current copy of the data. If a power outage occurs after the EIP of Sector 0 has been written to 0xA5A5, then NVM driver 220 will keep the EIP as 0xA5A5 but reissue the erase command.

Figure 9:
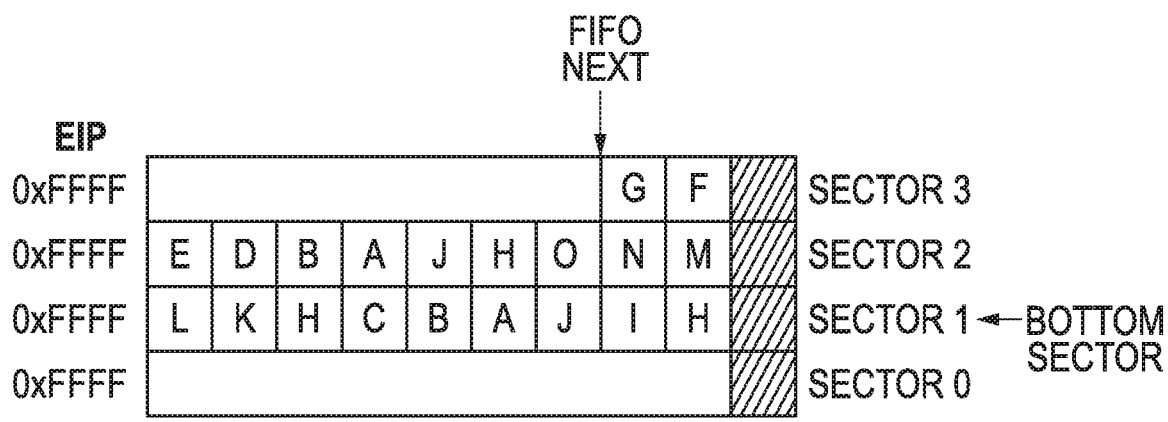
FIG. 9 illustrates a simplified diagram showing a state of the embedded flash after a second housekeeping function call.

FIG. 9 illustrates a simplified diagram showing a state 900 of the embedded flash after a second housekeeping function call. NVM driver 220 sees that Sector 0 is marked for erasure, sets the BOTTOM SECTOR to point to Sector 1, and starts the erase operation. State 900 shows that the erase operation has completed. At the end of the erase operation, NVM driver 220 resets the EIP to 0xFFFF.

Figure 10:
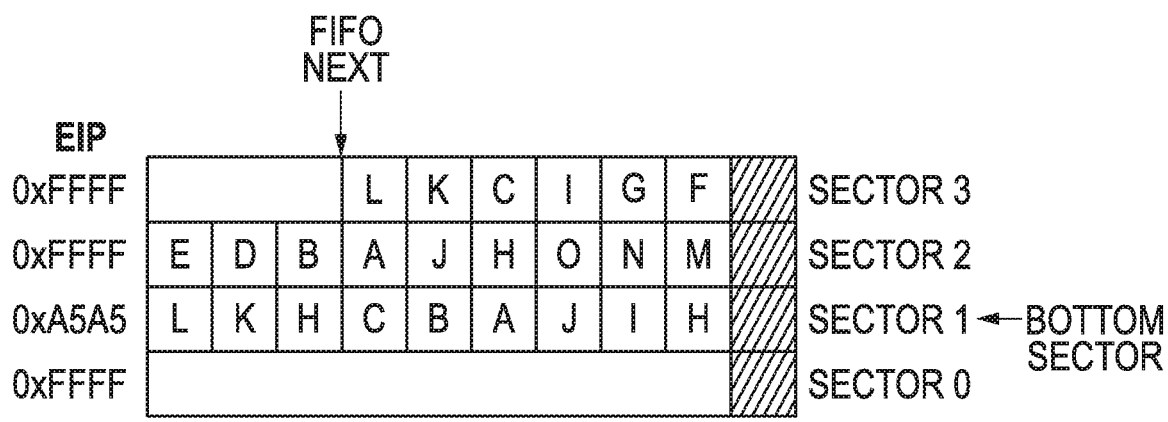
FIG. 10 illustrates a simplified diagram showing a state of the embedded flash after a third housekeeping function call.

FIG. 10 illustrates a simplified diagram showing a state 1000 of the embedded flash after a third housekeeping function call. In response to receiving the housekeeping function call, NVM driver 220 identifies the data elements in the new bottom sector (Sector 1) that are the current copies, and moves them to the top of the circular buffer. Thus, elements I, C, K, and L are the data elements in Sector 1 that are the current copies, and they are moved to the next locations in Sector 3 using the FIFO NEXT pointer, which is updated after every move. After elements I, C, K, and L have been moved to Sector 3, NVM driver 220 writes a value of 0xA5A5 to the EIP field of sector header in Sector 1, indicating an erase is in progress and tagging Sector 1 for erase. In this way, on the next housekeeping function call, NVM driver 220 will determine that the operation to be performed is an erase of Sector 1.

Figure 11:
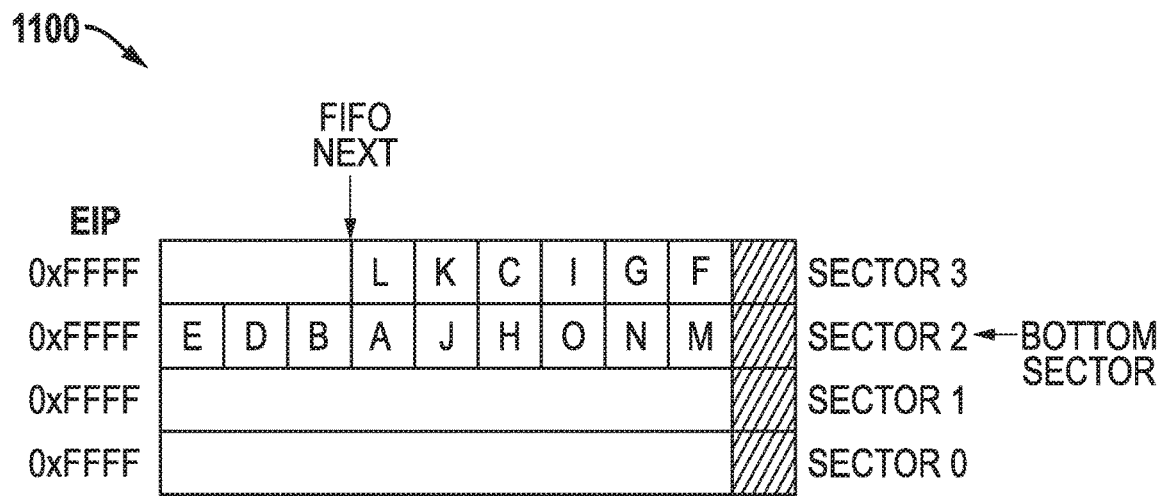
FIG. 11 illustrates a simplified diagram showing a state of the embedded flash after an end of the housekeeping operation.

FIG. 11 illustrates a simplified diagram showing a state 1100 of the embedded flash after an end of the housekeeping operation. NVM driver 220 sees that Sector 1 is marked for erasure, sets the BOTTOM SECTOR to point to Sector 2, and starts the erase operation. State 1100 shows that the erase operation has completed. At the end of the erase operation, the EIP of the sector header of Sector 1 is in its erased state, 0xFFFF.

Thus NVM driver 220 gives control to the application layer so that the high latency erase operation can be scheduled to occur at an appropriate time, such between mobile calls, when there are no apps running, etc. In addition, there is some overhead in writing flash memory locations as well. Thus, NVM driver 220 advantageously uses the housekeeping function call to perform either repacking or erase of the selected sector so that the maximum latency is limited to the longer of the write operation or the erase (which in a typical flash implementation will be the erase operation).

NVM Resizing

Figure 12:
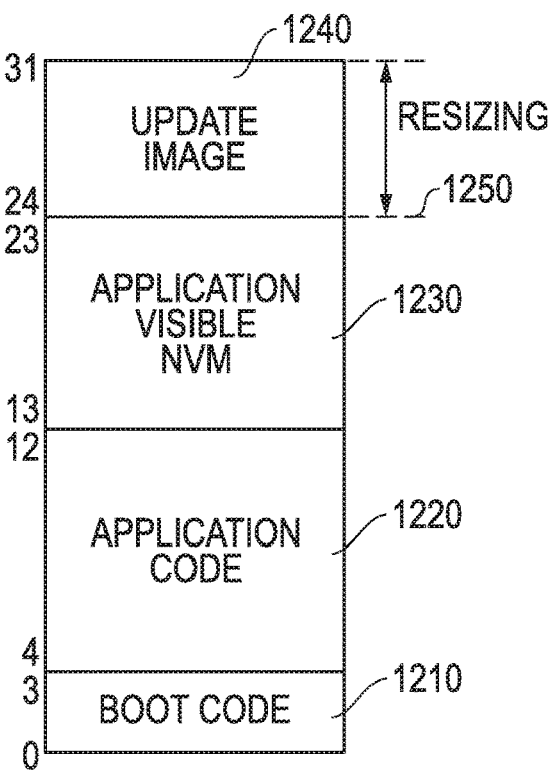
FIG. 12 illustrates an exemplary memory map of the flash memory of FIG. 1 showing a resizing function.

FIG. 12 illustrates an exemplary memory map 1200 of flash memory 132 of FIG. 1 showing a resizing function. As shown in this simple example, flash memory 132 has 32 sectors that are divided into four regions 1210, 1220, 1230, and 1240. Region 1210 includes sectors 0-3 and stores boot code for microcontroller 100. Region 1220 includes sectors 4-12 and stores application code for microcontroller 100. Region 1230 is a variable size region that may include sectors 13-23, and provides application visible NVM. Region 1240 includes sectors 24-31 and provides an application update image area. According to one aspect of microcontroller 100, a boundary 1250 between regions 1230 and 1240 can be altered in response to the resizing function. For example, microcontroller 100 may periodically update application code. Microcontroller 100 first downloads an image of the application code into update image area 1240. Once the download is complete, a bootloader stored in region 1210 verifies that it downloaded properly, and if it is valid overwrites the old application code stored in region 1220 with the new application code. Then the bootloader erases the update image, and boots into the updated application code. In many embedded applications, updates are relatively infrequent. For example, smart light bulbs and other highly embedded devices may update their application code only once or twice a year. In order to perform the update as shown in FIG. 12, microcontroller 100 temporarily shrinks the size of the application visible NVM to the minimal size, leaving enough space for the update image. After the bootloader completes the update, it deletes the update image as normal, and also expands the application visible NVM portion to include the update image area. The way in which NVM driver 220 implements the resizing function will now be explained.

Figure 13:
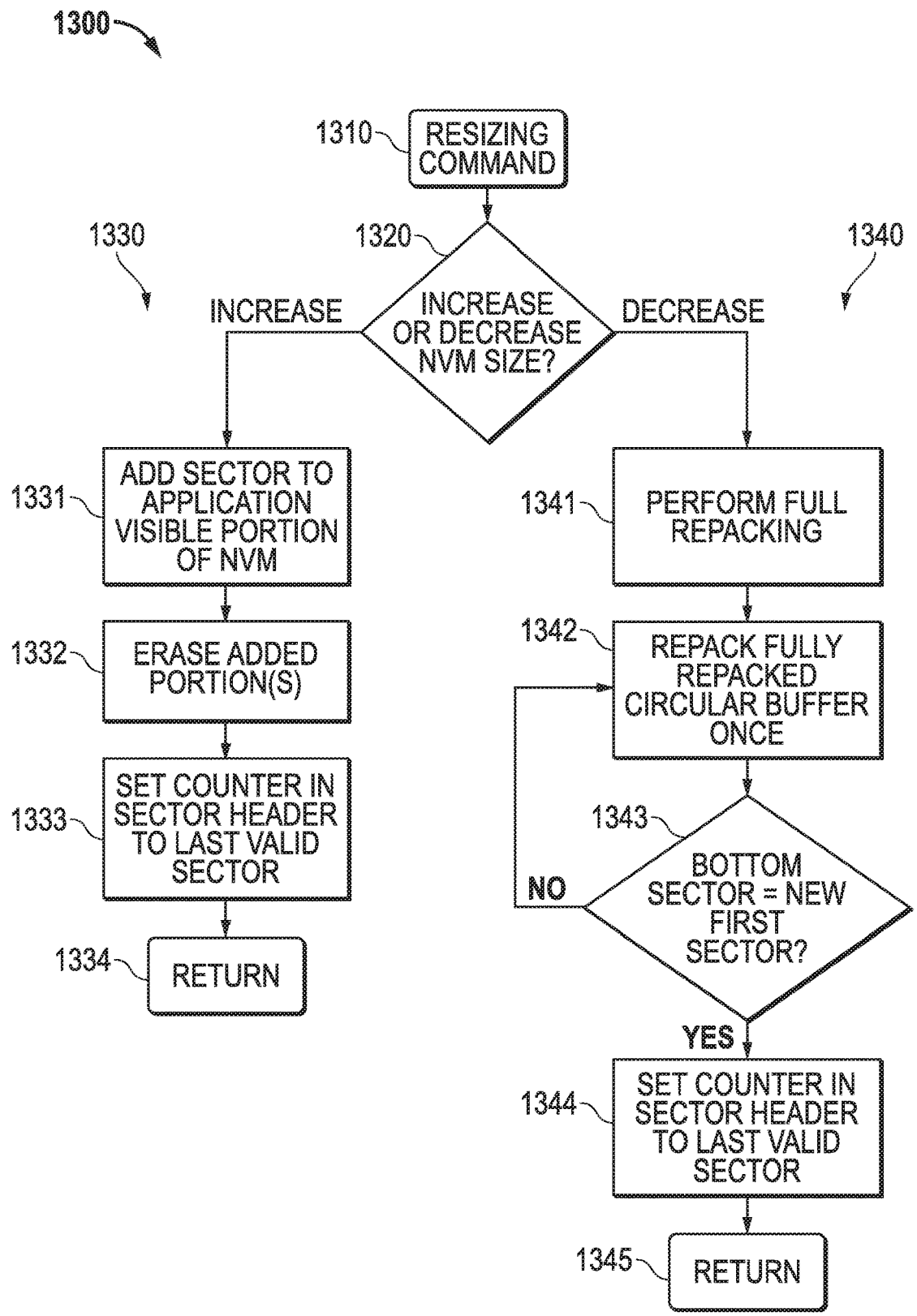
FIG. 13 illustrates a flow chart of the resizing function.

FIG. 13 illustrates a flow chart 1300 of the resizing function. In response to a resizing function call, NVM driver 220 first determines whether the resizing will increase or decrease the size of the application visible NVM and performs either a sub-flow 1330 or a sub-flow 1340, respectively. In sub-flow 1330 in action box 1331, NVM driver 220 first adds a sector to the bottom of region 1230. Next in action box 1332, NVM driver 220 indicates the erase to that sector is in progress by changing the value of the EIP field of the header of the added sector, and then begins an erase operation. Finally in action box 1333, NVM driver 220 sets the COUNTER field in the sector header to be equal to the COUNTER field in the last valid sector. This operation preserves the location of the bottom sector. At action box 1334, sub-flow 1330 ends.

In sub-flow 1340 in action box 1341, NVM driver 220 first performs a full repacking operation. Full repacking occurs when there are no more stale sectors in the memory map. Next at action box 1342, the fully repacked data is repacked again once, even though the repacking will merely move valid data. At decision box 1343, NVM driver 220 determines whether the bottom sector of the circular buffer is the sector that will be the new first sector, leaving a sector at the bottom of this area free. If not, then flow returns to action box 1342, and repacking the repacked circular buffer is again performed one time. However if the repacking has made the first new sector the bottom sector, then flow proceeds to action box 1344. In action box 1344, NVM driver 220 sets the COUNTER value in the sector header of the top of the circular buffer to be the last valid sector. At action box 1345, sub-flow 1340 ends.

The resizing operation leverages the fact that the resizing will be relatively rare, and that application program updates will be less frequent than application visible NVM updates. Thus the sector added to the resized user visible NVM indicates a higher number of erasures than actually have taken place, but this higher number is the same as the other sectors in the application visible portion of the NVM.

Uniform Wear-Leveling Counter Objects

Figure 14:
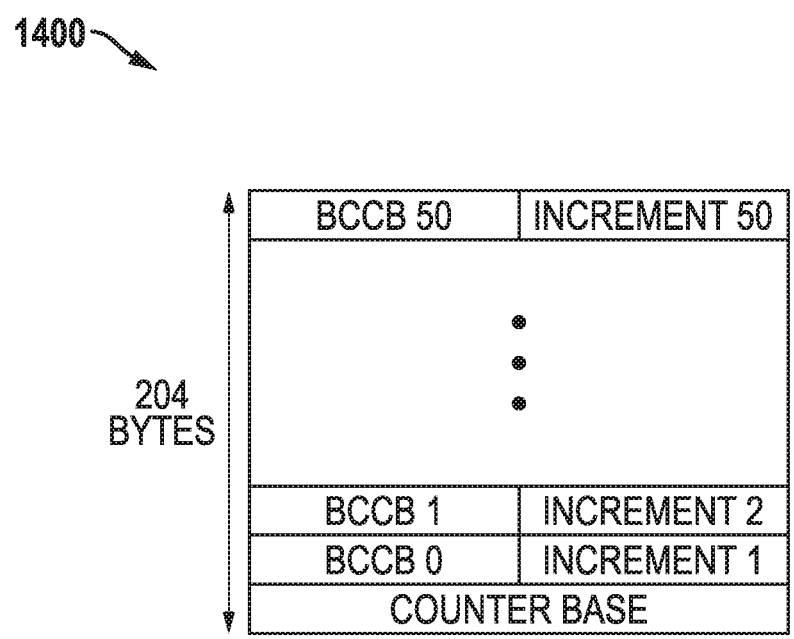
FIG. 14 illustrates a diagram showing the format of the data portion of a counter-type object.

FIG. 14 illustrates a diagram showing the format of the data portion 1400 of a counter-type object. The data portion of each counter type object is formed using a base/increment structure. NVM driver 220 uses the small object header with a LEN field of 0x7A when defining a counter type small object, and the large format header with a LEN field of 0x7B when defining a counter type large object. The size of the data portion is fixed at 204 bytes. NVM 204 uses a large object header only when the remaining portion of the current sector is smaller than 208 bytes since only the large object allows the object to be fragmented in two sectors.

In data portion 1400, the first four bytes are used to store the base counter value, and the remaining 200 bytes store counter increment values. Data portion 1400 uses a 32-bit bus structure and the lower part of each 32-bit word contains the increment amount and the upper 16 bits form a field for storing a 5-bit BCCB. In an alternative embodiment using a 16-bit bus, each 16-bit half of the 32-bit words contains an 8-bit increment along with an 8-bit field for storing a 4-bit BCCB.

NVM driver 220 computes the actual counter value by adding the base value plus the sum of all the increments. Thus the number of counter updates that can be made is limited by the number of increment values. As shown in FIG. 14, there are 50 increments available. Once the number of increments has been exhausted, NVM driver 220 creates a new counter object by first summing all the increments and adding it to the current base value to obtain a new counter base value. Then the new counter base value is stored in a new object, leaving fifty more increments available.

In an alternative embodiment in which the microcontroller allows single 16-bit write accesses, the data portion of the counter type object can be modified to double the number of increments. In this case, each 32-bit word is divided into two halves, in which each half includes an 8-bit counter increment field and an 8-bit BCCB. By dividing the counter into 16-bit portions, the number of increments available can be increased from 50 to 100.

In yet another embodiment, NVM driver 220 can store a new counter base value without the need for creating a new counter object in memory. In this case, NVM driver 220 stores a new base counter value using two or three increment locations, depending on the flash technology used. The first increment location is set to an increment value of 0x0000 to indicate that the next increment location contains a new counter base value. All 16 bits of the next increment location store the least significant bits of the counter base, and the following lower 16 bits in the next 32-bit word stores the most significant 16 bits. In this case, the BCCB applies to the new 32 bits base value. For a 32-bit flash memory allowing single 32 bit writes, two increment locations are used to store the new base counter. For 32-bit flash allowing single 16 bit write accesses, three increments are used.

In response to a write counter function call, NVM driver 220 first checks whether a counter with an identical identification key is already present in the flash. If so, then NVM driver 220 accesses that counter object to determine whether the counter object has free increments available to update the counter value. If the counter object has at least one free increment value, then NVM driver 220 restores the counter value and the difference between the two counters is written to the next free increment location. If the counter difference exceeds the maximum value allowed for an increment, then NVM driver 220 can either to split the increment into two increments, or write the counter value as a new base value (by writing an increment of 0 followed by the counter value). If no counter with an identical identification key is found, or there is no free increment location, NVM driver 220 creates a new counter object and stores the counter value as the new counter base.

In response to a read counter function call, NVM driver 220 reads the counter object as appropriate to reconstruct the counter value by adding the counter base and all of the valud increments and returns the sum to the application layer.

Thus various embodiments of an NVM driver have been disclosed. The NVM driver provides various features to allow uniform wear-leveling of the flash memory. The NVM driver operates the flash memory as a circular buffer. It allows the application layer to invoke a new housekeeping command that allows the application layer to choose the timing of memory repacking and sector erase operations when longer latency can be tolerated. It also allows the dynamic resizing of the flash areas to increase or decrease the size of the application visible portion of the NVM. Finally it provides a new counter-type object that allows the NVM to store counters that are wear-leveled with the rest of the NVM.

The above-disclosed subject matter is to be considered illustrative, and not restrictive, and the appended claims are intended to cover all such modifications, enhancements, and other embodiments that fall within the true scope of the claims. For example, an NVM driver can use the housekeeping function, resizing, and counter object features independently or together. Moreover NVM driver 220 provides the capability of abstracting the interface to the flash hardware so that different flash hardware configurations are transparent to the API. An adaptation layer can be added if desired to translate an existing API to the native API of the driver. Also the check code was described in terms of a Berger code, however in other embodiments different type of data integrity checks can be used. Moreover the present interface was described in the context of a floating-gate flash memory, but it would be applicable to other types of non-volatile memory as described above.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-volatile memory driver, comprising:
   a function library defining a plurality of native function calls and having an input for receiving a selected native function call of said plurality of native function calls, and an output for providing at least one instruction in response to said selected native function call; and
   a hardware abstraction layer having an input coupled to said output of said function library for receiving said at least one instruction, and an output for providing a plurality of signals to cause a non-volatile memory to execute said at least one instruction,
   wherein the non-volatile memory driver maintains said non-volatile memory as a circular buffer using a bottom sector pointer and a next location pointer; and
   wherein in response to receiving a housekeeping command generated from a corresponding command from an application layer as said selected native function call, said function library causes said hardware abstraction layer to selectively repack valid data of a bottom sector indicated by said bottom sector pointer using said next location pointer, and to selectively erase said bottom sector.

2. The non-volatile memory driver of claim 1, wherein upon filling a first sector, said function library causes said hardware abstraction layer to
   update said next location pointer to a subsequent sector in a predetermined order in said non-volatile memory.

3. The non-volatile memory driver of claim 1, wherein when said selected native function call is a write command, said function library causes said hardware abstraction layer to:
   write data of said write command to said non-volatile memory using said next location pointer, and to update said next location pointer according to a size of said data.

4. The non-volatile memory driver of claim 3, wherein in response to said write command, said function library further causes said hardware abstraction layer to:
   write said data of said write command using a large object having a first type of header if said size of said data is greater than a predetermined amount.

5. The non-volatile memory driver of claim 4, wherein in response to said write command, said function library further causes said hardware abstraction layer to:
   write said data of said write command using a small object having a second type of header if said size of said data is less than or equal to said predetermined amount and less than a remaining space in a current sector; and
   write a first portion of said data of said write command using a first large object to a said remaining space of said current sector and write a second portion of said data of said write command to a subsequent sector using a second large object if said size of said data is less than or equal to said predetermined amount and greater than said remaining space in said current sector.

6. The non-volatile memory driver of claim 1, wherein when said selected native function call is said housekeeping command, said function library causes said hardware abstraction layer to:
   store an erase-in-progress indication in said bottom sector.

7. The non-volatile memory driver of claim 6, wherein when said selected native function call is said housekeeping command, said function library further causes said hardware abstraction layer to:
   maintain said erase-in-progress indication until said bottom sector is erased and said bottom sector pointer indicates a subsequent sector in a predetermined order.

8. The non-volatile memory driver of claim 1, further comprising:
   an adaptation layer having an input for receiving a first foreign function call of a selected one of a plurality of available function calls of a first foreign application programming interface, and having an output coupled to a first input of said function library for providing one of said plurality of native function calls in response to said first foreign function call.

9. A method comprising:
   receiving a selected native function call of a plurality of native function calls;
   providing at least one instruction in response to said selected native function call;
   providing a plurality of signals to cause a non-volatile memory to execute said at least one instruction;
   maintaining said non-volatile memory as a circular buffer using a bottom sector pointer and a next location pointer; and
   when said selected native function call is a housekeeping command generated from a corresponding command from an application layer, selectively repacking valid data of a bottom sector indicated by said bottom sector pointer using said next location pointer, and selectively erasing said bottom sector.

10. The method of claim 9, further comprising:
    filling a first sector; and
    updating said next location pointer to a subsequent sector in a predetermined order in said non-volatile memory.

11. The method of claim 9, further comprising:
    receiving a write command as said selected native function call;
    writing data of said write command to said non-volatile memory using said next location pointer; and
    updating said next location pointer according to a size of said data.

12. The method of claim 11, further comprising:
writing said data of said write command using a large object having a first type of header if said size of said data is greater than a predetermined amount;
writing said data of said write command using a small object having a second type of header if said size of said data is less than or equal to said predetermined amount and less than a remaining space in a current sector; and
writing a first portion of said data of said write command using a first large object to said remaining space of said current sector and writing a second portion of said data of said write command to a subsequent sector using a second large object if said size of said data is less than or equal to said predetermined amount and greater than said remaining space in said current sector.

13. The method of claim 9, further comprising:
storing an erase-in-progress indication in said bottom sector when said selected native function call is said housekeeping command.

14. The method of claim 13, further comprising:
erasing said bottom sector;
indicating a subsequent sector in a predetermined order as a new bottom sector; and
clearing said erase-in-progress indication in response to a completion of said erasing and said indicating.

15. A non-volatile memory driver, comprising:
a function library defining a housekeeping command as a native function call having an output for providing at least one instruction in response receiving said housekeeping command; and
a hardware abstraction layer coupled to said function library for receiving said at least one instruction, and having an output for providing a plurality of signals to cause a non-volatile memory to execute said at least one instruction,
wherein the non-volatile memory driver maintains said non-volatile memory as a circular buffer using a bottom sector pointer and a next location pointer; and
wherein in response to receiving said housekeeping command, said function library causes said hardware abstraction layer to selectively repack valid data of a bottom sector indicated by said bottom sector pointer using said next location pointer, and to selectively erase said bottom sector.

16. The non-volatile memory driver of claim 15, wherein upon filling a first sector, said function library causes said hardware abstraction layer to
update said next location pointer to a subsequent sector in a predetermined order in said non-volatile memory.

17. The non-volatile memory driver of claim 15, wherein in response to a write command, said function library causes said hardware abstraction layer to:
write data of said write command to said non-volatile memory using said next location pointer, and to update said next location pointer according to a size of said data.

18. The non-volatile memory driver of claim 17, wherein in response to said write command, said function library further causes said hardware abstraction layer to:
write said data of said write command using a large object having a first type of header if said size of said data is greater than a predetermined amount.

19. The non-volatile memory driver of claim 18, wherein in response to said write command, said function library further causes said hardware abstraction layer to:
write said data of said write command using a small object having a second type of header if said size of said data is less than or equal to said predetermined amount and less than a remaining space in a current sector; and
write a first portion of said data of said write command using a first large object to a said remaining space of said current sector and write a second portion of said data of said write command to a subsequent sector using a second large object if said size of said data is less than or equal to said predetermined amount and greater than said remaining space in said current sector.

20. The non-volatile memory driver of claim 15, wherein in response to said housekeeping command, said function library causes said hardware abstraction layer to:
store an erase-in-progress indication in said bottom sector.

21. The non-volatile memory driver of claim 20, wherein in response to said housekeeping command, said function library further causes said hardware abstraction layer to:
maintain said erase-in-progress indication until said bottom sector is erased and said bottom sector pointer indicates a subsequent sector in a predetermined order.

22. The non-volatile memory driver of claim 15, further comprising:
an adaptation layer having an input for receiving a first foreign function call of a selected one of a plurality of available function calls of a first foreign application programming interface, and having an output coupled to a first input of said function library for providing one of a plurality of native function calls in response to said first foreign function call.

\* \* \* \* \*